United States Patent
Colon-Bonet et al.

(10) Patent No.: US 6,615,228 B1
(45) Date of Patent: Sep. 2, 2003

(54) SELECTION BASED ROUNDING SYSTEM AND METHOD FOR FLOATING POINT OPERATIONS

(75) Inventors: Glenn T Colon-Bonet, Ft Collins, CO (US); Stephen L Bass, Ft Collins, CO (US)

(73) Assignee: Hewlett-Packard Development Company, LP, Houston, TX (US)

( * ) Notice: Subject to any disclaimer, the term of this patent is extended or adjusted under 35 U.S.C. 154(b) by 495 days.

(21) Appl. No.: 09/583,362

(22) Filed: May 30, 2000

(51) Int. Cl.[7] .................................................. G06F 7/38
(52) U.S. Cl. ...................................................... 708/497
(58) Field of Search ................................. 708/497, 551

(56) References Cited

U.S. PATENT DOCUMENTS

| | | | |
|---|---|---|---|
| 5,408,426 A | * 4/1995 | Takewa et al. ............. | 708/497 |
| 5,798,952 A | 8/1998 | Miller, Jr. et al. ........ | 364/715.1 |
| 6,148,314 A | * 11/2000 | Matheny et al. ............. | 708/497 |
| 6,269,384 B1 | * 7/2001 | Oberman ..................... | 708/497 |
| 6,314,442 B1 | * 11/2001 | Suzuki ....................... | 708/497 |
| 2002/0129075 A1 | * 9/2002 | Park et al. .................. | 708/505 |

* cited by examiner

Primary Examiner—David H. Malzahn (57) ABSTRACT

A selection based rounding system and method eliminate the need for post increment based rounding in a floating point (FP) fused multiply adder that can be utilized in a processor or other digital circuit to significantly increase speed. Generally, an unincremented result and an incremented result are produced in parallel and then either one is selected as a rounded result based upon specified rounding criteria, thereby eliminating the time consuming need for an incrementor to perform rounding at or near the end of the FP fused multiply adder.

19 Claims, 6 Drawing Sheets

SELECTION BASED ROUNDING SYSTEM AND METHOD FOR FLOATING POINT OPERATIONS

TECHNICAL FIELD

The present invention generally relates to digital circuits and processors, and more particularly, to a selection based rounding system and method for eliminating the need for post increment based rounding in floating point (FP) arithmetic operations. Eliminating the post increment based rounding operation significantly increases speed. Although not limited to this particular application, the selection based rounding system and method of the invention are particularly suited for implementation in connection with a FP fused multiply adder of a high performance chip-based microprocessor or other digital circuit.

BACKGROUND OF THE INVENTION

Currently, many arithmetic operations in present implementations of microprocessors are sped up by utilizing an on-board floating point (FP) processor, which implements FP mathematics (i.e., mathematics involving operation upon expressions having a significand and an exponent, where the value of each expression is equal to its significand multiplied by $2^{exponent}$), typically on very large numbers. These FP processors can include a fused multiply adder to increase the performance of the FP operations.

Fused multiply adders are well known in the art. In a typical fused multiply adder, two operands, for example, A and B, are multiplied together, and added to another operand C, so that the result $R=A*B+C$ or the result $R=A*B-C$. Generally, in the circuitry, the operands A and B are first multiplied together, while the other operand C is shifted, and then the product of A and B is added to the shifted C. Next, the sum is normalized by a shifting operation, and finally, the shifted sum is rounded.

As in many FP operations, it is frequently required that a result of a FP operation be rounded. IEEE and other industry standards specify different types of rounding processes, for example, round to zero, round to nearest, round to negative infinity, and round to positive infinity. The computation of whether the resulting FP number needs to be rounded and the rounding process itself can significantly undesirably impede the performance and hardware complexity of the fused multiply adder.

The result R is provided in a form that is unincremented or that is incremented, in order to satisfy the rounding requirement. For example, if there were a rounding requirement of either round to zero or round to negative infinity, then the unincremented result R would be output. If there were a rounding requirement of round to positive infinity, then the incremented result R would be output. Further, if the rounding requirement were round to nearest, then either the incremented or unincremented result R would be output.

Figure 1:
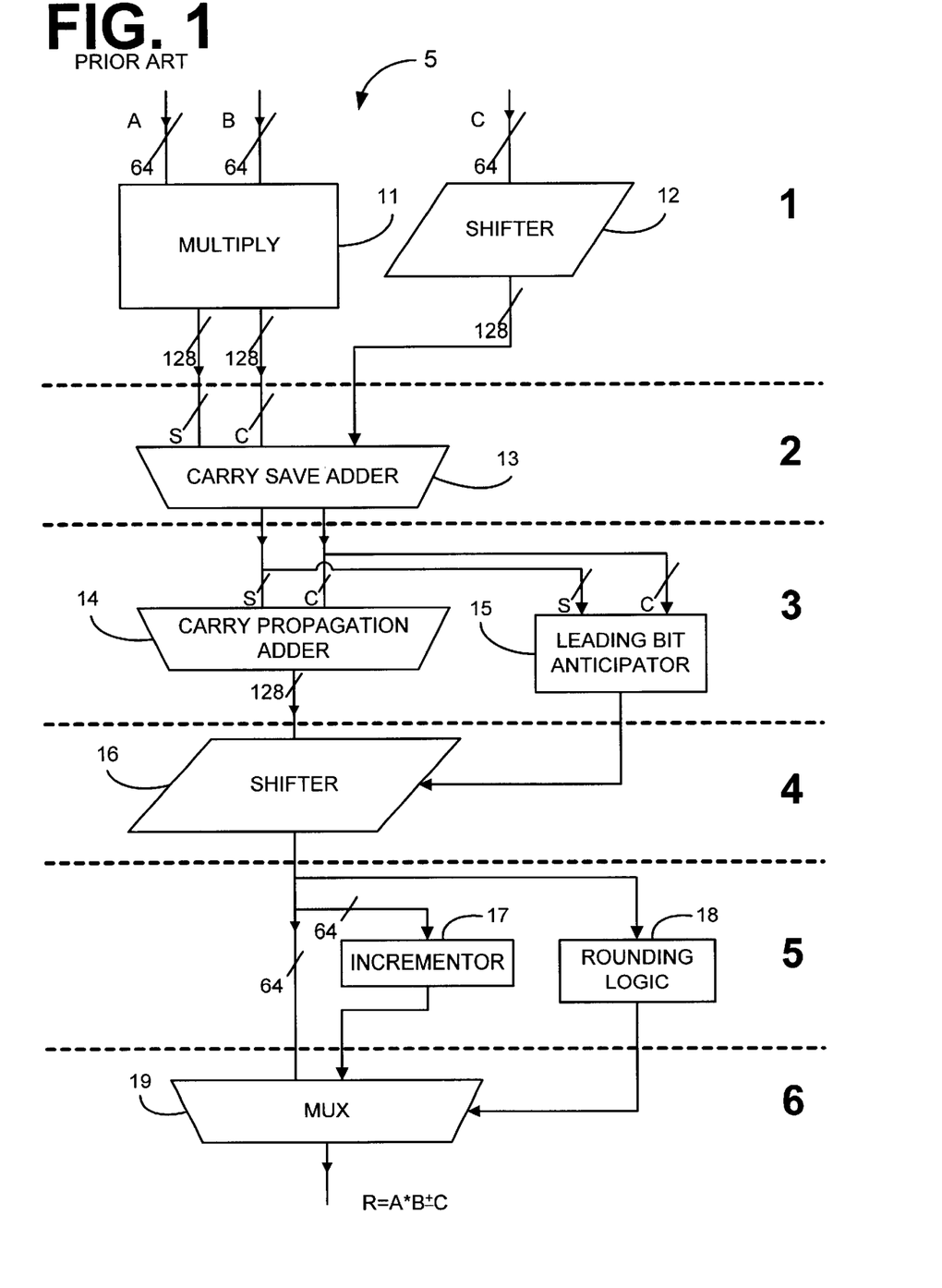
FIG. 1 is block diagram of a fused multiply adder of the prior art that implements undesirable a post increment based rounding system.

To more specifically explain the rounding/incrementing process, consider an example of a FP fused multiply adder with rounding capabilities shown in FIG. 1 and generally denoted by reference numeral 5. The fused multiply adder 5 of FIG. 1 is designed to operate upon the significand portions (nonexponent part) of FP numbers. As is well known in the art, the exponent portions of such FP numbers are processed separately from the significand portions, and such processing is not described here for simplicity. As shown in FIG. 1, the fused multiply adder 5 includes a multiplier 11 that receives and multiplies two numbers A, B (for example, 64-bits each). Shifter 12 shifts the operand C by a predetermined amount in order to normalize it with respect to the mathematical product of A and B and to thereby enable it to be appropriately combined with the product of A and B at a later time.

The sum and carry outputs (for example, 128 bits each) of the multiplier 11 and the output of the shifter 12 are input into carry save adder 13, the design and operation of which is well known in the art. The sum and carry data from multiplier 11 are input to the carry save adder 13 as the addend and augend, respectively. The input from the shifter 12 is considered the carry-in from a less significant stage of the FP fused multiply adder 5. The carry save adder 13 generates a sum output and a carry output. Both the sum and carry outputs are input into a carry propagation adder 14 and a leading bit anticipator 15. The carry propagation adder 14 combines the sum and carry output from the carry save adder 13 to produce a FP number that is input into shifter 16. The design and operation of a carry propagation adder is also well known in the art.

The leading bit anticipator 15 computes a shift number that is equal to the number of significant bits to be shifted out to eliminate the leading zeros in the FP number generated by the carry save adder 13. The leading bit anticipator 15 also computes the shift number in a particular direction. This is done in order to determine the normalization of the sum and carry output of the carry save adder 13, for add, subtract, multiply or divide operations. An example of one of many possible architectures for the leading bit anticipator 15 is described in U.S. Pat. No. 5,798,952 to Miller et al.

The shift number generated by the leading bit anticipator 15 is input into shifter 16. Shifter 16 then performs a shifting operation on the FP number. The FP number is shifted by a number of bits equal to the shift number generated by the leading bit anticipator 15. Shifter 16 performs the function of shifting the FP number to the right or left alternatively as directed by the shift number. This is to eliminate the leading zeros of the FP number (i.e., normalizes the resulting FP number). The resulting normalized FP number is input into incrementor 17, rounding logic 18, and multiplexer (MUX) 19.

The incrementor 17 increments the normalized FP number to provide an incremented normalized FP number. The incrementor 17 inputs the incremented normalized FP number into MUX 19.

The rounding logic 18 determines if the normalized number output from shifter 16 requires rounding and the type based upon the examination of guard, round, and sticky bits associated with the output from shifter 16. The rounding logic 18 directs MUX 19 to select either the unincremented number or the incremented number for ultimate output from the FP fused multiply adder 5.

A major problem with the rounding architecture for a conventional FP fused multiply adder is that until the number resulting from a FP operation is normalized, it is very difficult, if not impossible, to determine whether the normalized result requires rounding. Since the incrementing of a result of a FP operation is performed after the normalization, extra time is needed to complete the FP operation. Furthermore, the incrementor is disadvantageous, as it can add many undesirable gate delays, i.e., at least $\log_2 N$ gate delays where N is the number of bits. Both of the foregoing significantly compromises the performance of the fused multiply adder 5.

Thus, a heretofore unaddressed need exists in the industry for a way to address the aforementioned deficiencies and inadequacies, particularly, a way to better perform rounding, or incrementing, in a fused multiply adder 5.

SUMMARY OF THE INVENTION

The present invention provides a selection based rounding system and method for eliminating the need for post increment based rounding in floating point (FP) arithmetic operations. Eliminating the post increment based rounding operation significantly increases speed. Although not limited to this particular application, the selection based rounding system and method of the invention are particularly suited for implementation in connection with a FP fused multiply adder of a high performance chip-based microprocessor or other digital circuit.

Generally, in an FP fused multiply adder that employs the selection based rounding system, an unincremented result and an incremented result are produced substantially concurrently, in parallel, and then either one of the foregoing is selected as a rounded result based upon specified rounding criteria, thereby eliminating the need for an incrementor to perform rounding at or near the end of the FP fused multiply adder.

A specific preferred embodiment (intended to be a nonlimiting example; other implementations are possible) of the fused multiply adder that employs the selection based rounding system includes: (1) a multiplier designed to combine first and second operands A, B to produce a product; (2) a first shifter designed to shift a third operand C so that the third operand can be combined with the product; (3) a carry save adder designed to combine the product and the shifted third operand to produce a first sum and a first carry; (4) a leading bit anticipator (LBA) designed to determine an approximate leading bit location in the first sum and for producing an LBA word that defines a one approximately in a least significant bit position of the first sum; (5) a first carry propagation adder designed to combine the first sum and the first carry to produce the result; (6) a second carry propagation adder designed to combine the LBA word with the first sum and the first carry to produce an approximate incremented result; (7) a second shifter designed to normalize the unincremented result; (8) a third shifter designed to normalize the approximate incremented result; (9) a least significant bit fixup mechanism designed to convert the approximate incremented result into an accurate incremented result; (10) a MUX designed to receive the unincremented result and the accurate incremented result; and (11) rounding logic designed to select the unincremented result and to select the accurate incremented result, only either one at a time, by controlling the MUX, based upon rounding indicia associated with the unincremented result. The result R=A*B+C or the result R=A*B−C.

The present invention can also be viewed as providing one or more methods. One such method can be broadly conceptualized as a process for a FP fused multiply adder having the following steps: computing in parallel an unincremented result and an incremented result; and selecting either the unincremented result or the incremented result as a FP rounded number.

Other systems, methods, features, and advantages of the present invention will become apparent to one with skill in the art upon examination of the following drawings and detailed description. It is intended that all such additional systems, methods, features, and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The selection based rounding system and method(s) of the present invention can be implemented in any fused multiply adder for floating point (FP) numbers. Moreover, the fused multiply adder can be implemented in any processor (e.g., a chip based microprocesser, etc.) or other suitable digital circuit, either of which in turn can be implemented in any computer (e.g., a personal computer, workstation, etc.) or other suitable digital device.

Figure 2:
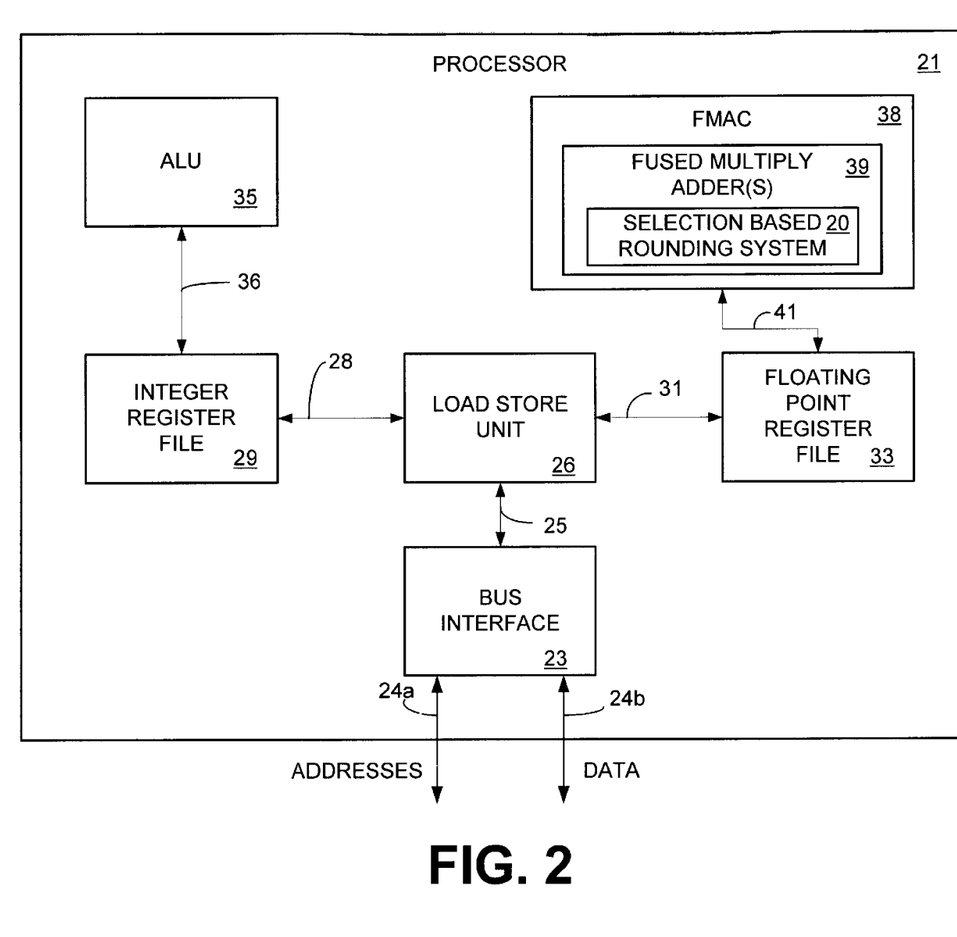
FIG. 2 is a block diagram of a microprocessor employing the selection based rounding system of the present invention.

FIG. 2 is a block diagram of a processor 21 having a fused multiply adder(s) 39 employing the selection based rounding system 20 (and method(s)) of the present invention. With the exception of the selection based rounding system 20 itself, all of the following elements are well known and well understood in the art, and only a brief explanation of their associated functions is described for simplicity. The processor 21 can be, for example but not limited to, a microprocessor microchip fabricated in accordance with well known fabrication techniques. As illustrated in FIG. 2, in architecture, the processor 21 includes a bus interface 23 designed to communicate addresses 24a and data 24b. A load store unit 26 performs the function of managing data exchange between a remote device (not shown for simplicity; e.g., memory, an input/output (I/O) device, etc.) and the processor 21. Said another way, the load store unit 26 is designed to perform loads and stores of data in an integer register file 29, a FP register file 33, and the remote device. An arithmetic logic unit (ALU) 35 accesses (reads from and writes to) the integer register file 29 and performs mathematical operations upon integers. A FP multiply accumulate unit (FMAC) 38 accesses the FP register file 33 and performs mathematical operations upon FP numbers. The FMAC 38 may employ one or more fused multiply adders 39, which may implement the selection based rounding system 20 of the present invention.

A. First Embodiment Of Fused Multiply Adder

Figure 3:
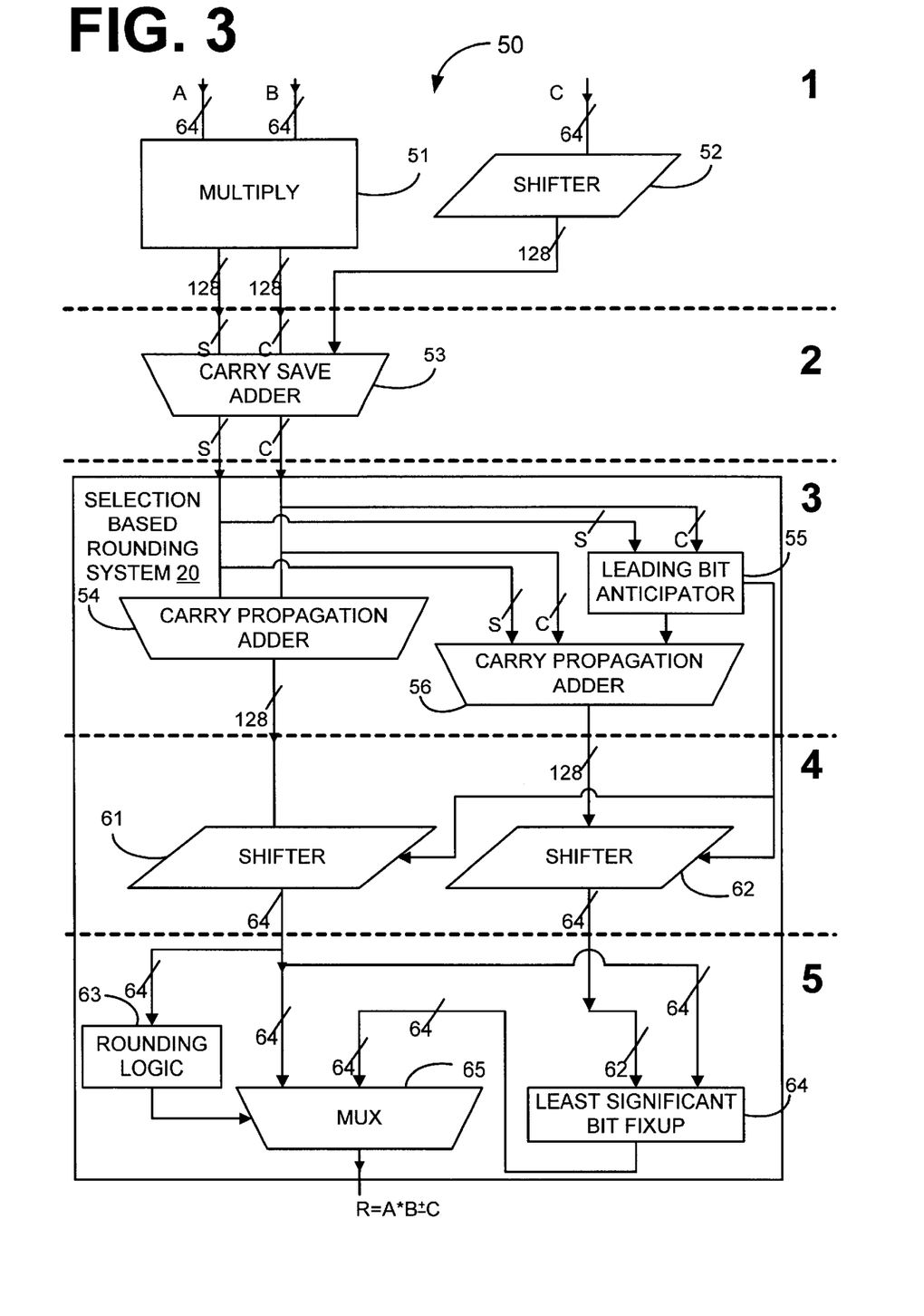
FIG. 3 is a block diagram of a first embodiment of a FP fused multiply adder that employs the selection based rounding system of FIG. 2.

Illustrated in FIG. 3 is a first embodiment (a possible nonlimiting example) of a FP fused multiply adder, generally denoted by reference numeral 50, that employs the selection based rounding system 20 (FIG. 2) of the present invention. The fused multiply adder 50 (as well as the second embodiment in FIG. 4) is designed to operate upon the significand portions (nonexponent part) of FP numbers within a processor or other digital circuit.

In the fused multiply adder 50, two operands, for example, A and B, are multiplied together, and added to another operand C, so that the result R=A*B+C, or alternatively, the result R=A*B−C. The subtraction of C is performed essentially by taking the 2's complement of C and adding it to the product A*B. Moreover, the result R is provided in a form that is unincremented or that is incremented, in order to satisfy a rounding requirement. For example, if there were a rounding requirement of either round to zero or round to negative infinity, then the unincremented result would be output. If there were a rounding requirement of round to positive infinity, then the incremented result would be output. Finally, if there were a rounding requirement of round to nearest, then either the unincremented result or the incremented result would be output.

For readily comparing the performance of the fused multiply adder 50 in FIG. 3 to that of the prior art fused multiply adder 5 (FIG. 1), the fused multiply adder 50 is segregated, or divided, into timing sections, that include logic operations occurring in roughly the same timing period. In essence, each of the timing sections corresponds to one or more logic gate delays. As can be seen in FIG. 3, the FP fused multiply adder 50 is segregated, or divided, into five timing periods. In those cases where a plurality of logic is within the same timing period, the logic operations are performed approximately concurrently. As is clear by comparing the timing sections of the adder 50 of FIG. 3 that employs the selection based rounding system 20 (FIG. 2) with those timing sections of the prior art fused multiply adder 5 (FIG. 1), the fused multiply adder 50 of the present invention is much faster than the prior art adder 5. There are less timing sections in FIG. 3 than in FIG. 1. In fact, in terms of gate delays, the increase in speed is likely around 5 to 6 gate delays, which is significant in processor design.

As further shown in FIG. 3, the fused multiply adder 50 includes a multiplier 51 that receives and multiplies two numbers A, B (for example, 64-bits each). Shifter 52 shifts the operand C by a predetermined amount in order to normalize it with respect to the mathematical product of A and B and to thereby enable it to be appropriately combined with the product of A and B at a later time.

The sum and carry outputs (for example, 128 bits each) of the multiplier 51 and the output of the shifter 52 are input into carry save adder 53, the design and operation of which is well known in the art. The sum and carry data from multiplier 51 are input to the carry save adder 53 as the addend and augend, respectively. The input from the shifter 52 is considered the carry-in from a less significant stage of the FP fused multiply adder 50. The carry save adder 53 generates a sum output and a carry output. Both the sum and carry outputs are input into a carry propagation adder 54 and a leading bit anticipator 55. The carry propagation adder 54 combines the sum and carry output from the carry save adder 53 to produce a FP number that is input into shifter 61.

The leading bit anticipator 55 computes, among other things, a shift number that is equal to the number of significant bits to be shifted out to eliminate the leading zeros in the FP number generated by the carry save adder 53. The leading bit anticipator 55 also computes the shift number in a particular direction. This is done in order to normalize of the sum and carry output of the carry save adder 53, for add, subtract, multiply or divide operations. An example of one of many possible architectures for the leading bit anticipator 55 in FIG. 3 is described in U.S. Pat. No. 5,798,952 to Miller et al., which is incorporated herein by reference.

The leading bit anticipator 55 can also calculate where the most significant bit (MSB) is located in the FP number generated by the carry save adder 53. Once the location of the MSB is determined, it is then possible to estimate the position of the LSB within 1 bit, since the bit-width of the device is known and since there is a known relationship between the unincremented number and the incremented number (the incremented number=unincremented number or unincremented number−1). The bit-width of the device can be any suitable size n, for example, 4, 8, 16, 32, 64, 128, 256, 512, etc. In the preferred embodiments, the bit-width is 64 bits. The shift is estimated to be (n−1), or 63 bits, in the preferred embodiments, and this shift will be exact or within one bit.

Figure 4A:
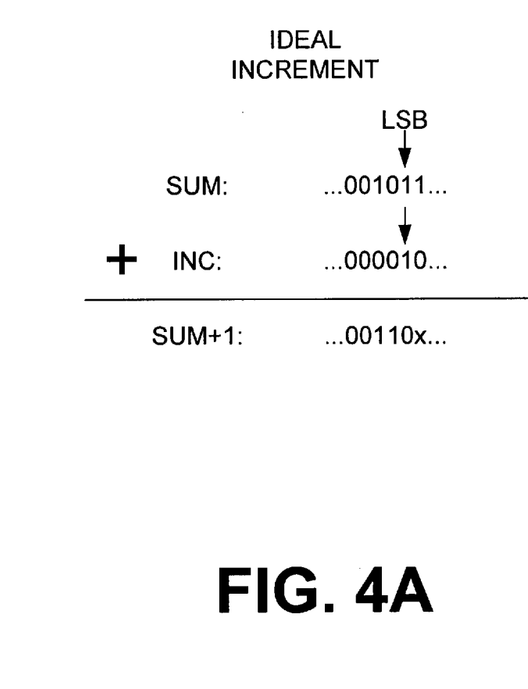
FIG. 4A is a mathematical diagram showing an ideal incrementing process.

Once the position of the LSB is estimated, it is then possible to compute an approximate incremented FP number by adding 1 to the estimated LSB of the FP number. As illustrated in FIG. 4A, as an example, assume that the number SUM is output from the carry save adder 53 and exhibits the following binary sequence: . . . 001011 . . . In order to round the number, it is incremented by I in the LSB position. So, therefore, an increment word INC=. . . 000010 . . . is added to the SUM=. . . 001011 . . . in order to generate the incremented FP number SUM+1=. . . 00110x . . . , where x could be either 1 or 0.

Figure 4B:
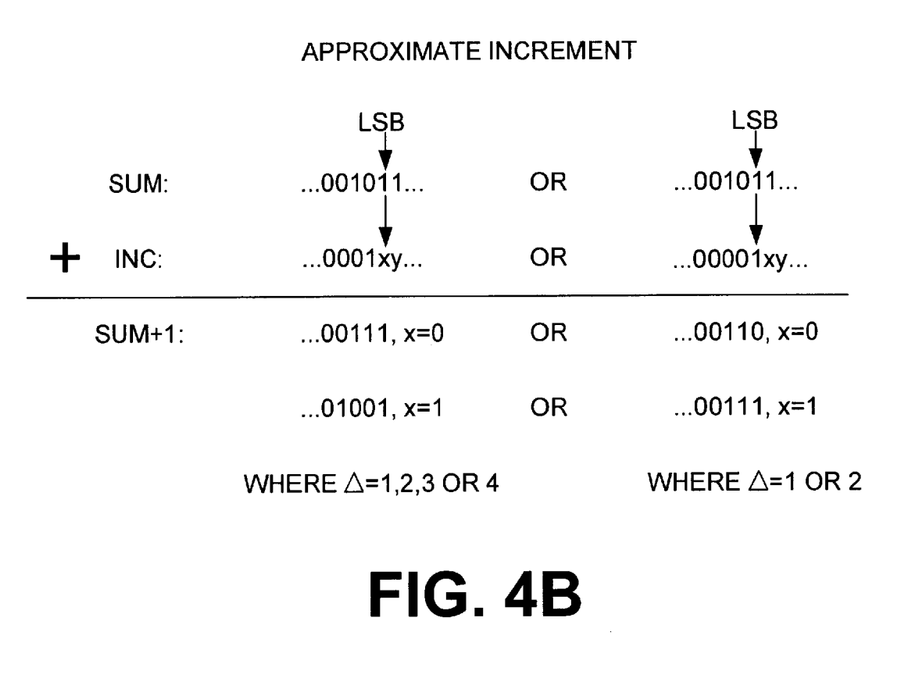
FIG. 4B is a mathematical diagram showing an approximate incrementing process that is performed collectively by the leading bit anticipator and a carry propagation adder associated with the selection based rounding system of FIGS. 2 and 3.

However, the LSB position is merely an estimate. As illustrated in FIG. 4B, the estimated LSB position may be exact or off by a bit and, therefore, in terms of the incremented number SUM+1, it may be off by Δ=1, 2, 3, or 4.

Accordingly, referring back to FIG. 3, the leading bit anticipator 55 communicates an LBA word having a bit with binary logic state 1 to the carry propagation adder 56 that is shifted to the right by 63 bits from the bit location of the identified MSB of the number from the carry save adder 53. Preferably, the shift is implicitly accomplished by a hardwired connection (i.e., output bit connection j of the anticipator 55 connected to input bit connection j-63 of the adder 56) between the leading bit anticipator 55 and the carry propagation adder 56.

The carry propagation adder 56 computes an approximate incremented version of the FP number generated by the carry save adder 53 by adding the 1 from the leading bit anticipator 55 to the sum and carry outputs from the carry save adder 53. This provides a rounding up, or incrementing, of the FP number.

Both the unincremented and approximate incremented FP numbers are input into shifters 61, 62, respectively, for normalization. The shift number computed by the leading bit anticipator 55 is equal to the bits to be shifted in order to eliminate the leading zeros in the FP number generated by the carry save adder 53. The shifters 61, 62, normalize the respective unincremented and approximate incremented FP numbers by shifting the FP numbers to the right or the left by the shift number. The shift operations normalize the numbers to within 1 bit of accuracy.

The normalized unincremented FP number from the shifter 61 is next input into a MUX 65.

The normalized approximate incremented FP number from shifter 62 has its two LSBs truncated, because these two bits may be inaccurate as a result of the previously described LSB estimation (and the approximate increment), and the truncated number is forwarded to the LSB fixup mechanism 64.

Figure 4C:
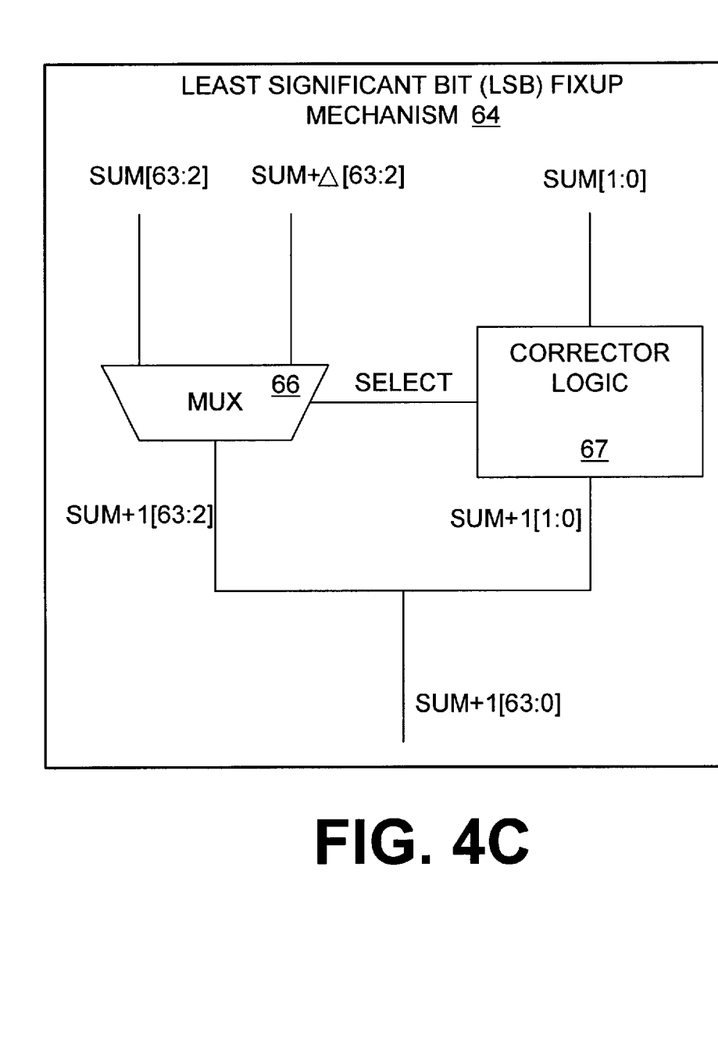
FIG. 4C is a block diagram of the LSB fixup mechanism of FIG. 3.

The LSB fixup mechanism 64 is constructed as shown in FIG. 4C. The LSB fixup mechanism 64 includes a multiplexer (MUX) 66 controlled by way of a select signal produced by corrector logic 67. The corrector logic 67 is configured to implement the logic defined by the truth table of FIG. 4D. As shown in FIG. 4C, the MUX 66 receives the part SUM[63:2] of the unincremented normalized FP number SUM and the part SUM+Δ[63:2] of the normalized approximate incremented FP number SUM+Δ and outputs the part SUM+1[63:2] of the accurate normalized incremented FP number SUM+1. The corrector logic 67 receives the part SUM[1:0] and outputs SUM+1[1:0]. Finally, SUM+1[63:2] is combined with SUM+1[1:0] in order to derive an accurate normalized incremented FP number SUM+1[63:0] for output to the MUX 65 (FIG. 3).

Figure 4D:
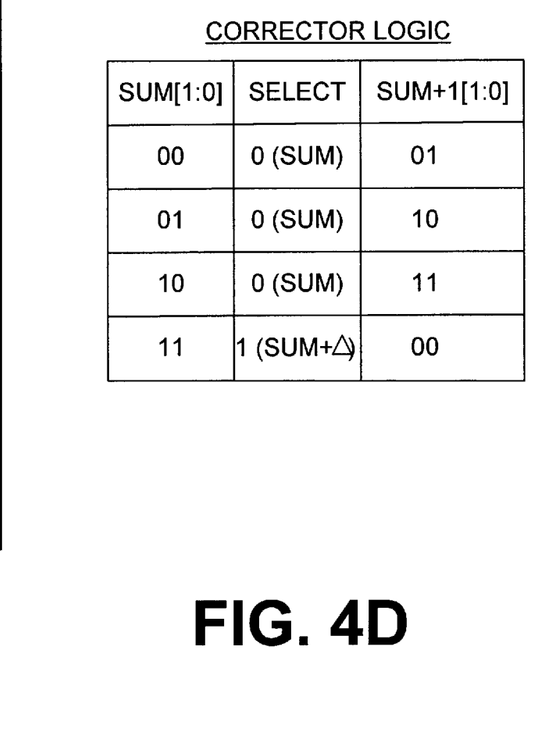
FIG. 4D is a truth table showing the logic implemented by the LSB fixup mechanism of FIGS. 3 and 4C.

Thus, the LSB fixup mechanism 64 and the corrector logic 67 operate as follows, with reference to both FIGS. 4C and 4D. First, if the two LSBs, or SUM[1:0], of the normalized unincremented FP number SUM are "00" respectively, then the corrector logic 67 outputs a select signal of "0" to the MUX 66, which causes a selection of SUM[63:2] to be output as SUM+1[63:2], and furthermore, the corrector logic 67 also outputs "01" as the bits SUM+1[1:0], which are combined with SUM+1[63:2] to create SUM+1[63:0]. Second, if the two LSBs, or SUM[1:0], of the normalized unincremented FP number SUM are "01" respectively, then the corrector logic 67 outputs a select signal of "0" to the MUX 66, which causes a selection of SUM[63:2] to be output as SUM+1[63:2], and furthermore, the corrector logic 67 also outputs "10" as the bits SUM+1[1:0], which are combined with SUM+1[63:2] to create SUM+1[63:0]. Third, if the two LSBs, or SUM[1:0], of the normalized unincremented FP number SUM are "10" respectively, then the corrector logic 67 outputs a select signal of "0" to the MUX 66, which causes a selection of SUM[63:2] to be output as SUM+1[63:2], and furthermore, the corrector logic 67 also outputs "11" as the bits SUM+1[1:0], which are combined with SUM+1[63:2] to create SUM+1[63:0]. Finally, if the two LSBs, or SUM[1:0], of the normalized unincremented FP number SUM are "11" respectively, then the corrector logic 67 outputs a select signal of "1" to the MUX 66, which causes a selection of SUM+Δ[63:2] to be output as SUM+1[63:2], and furthermore, the corrector logic 67 also outputs "00" as the bits SUM+1[1:0], which are combined with SUM+1[63:2] to create SUM+1[63:0].

With reference back to FIG. 3, the resulting normalized unincremented FP number SUM generated by shifter 61 is input into a rounding logic 63. The rounding logic 63 determines if the normalized unincremented output from shifter 61 requires rounding and the rounding type (for example, round to zero, round to nearest, round to negative infinity−∞, and round to positive infinity+∞) based upon the examination of guard, round, and sticky bits associated with the output from shifter 61. The rounding logic 63 directs MUX 65 to select either the normalized unincremented FP number SUM or the normalized incremented FP number SUM+1 to be output from the FP fused multiply adder 50 as the result R.

B. Second Embodiment Of Fused Multiply Adder

Figure 5:
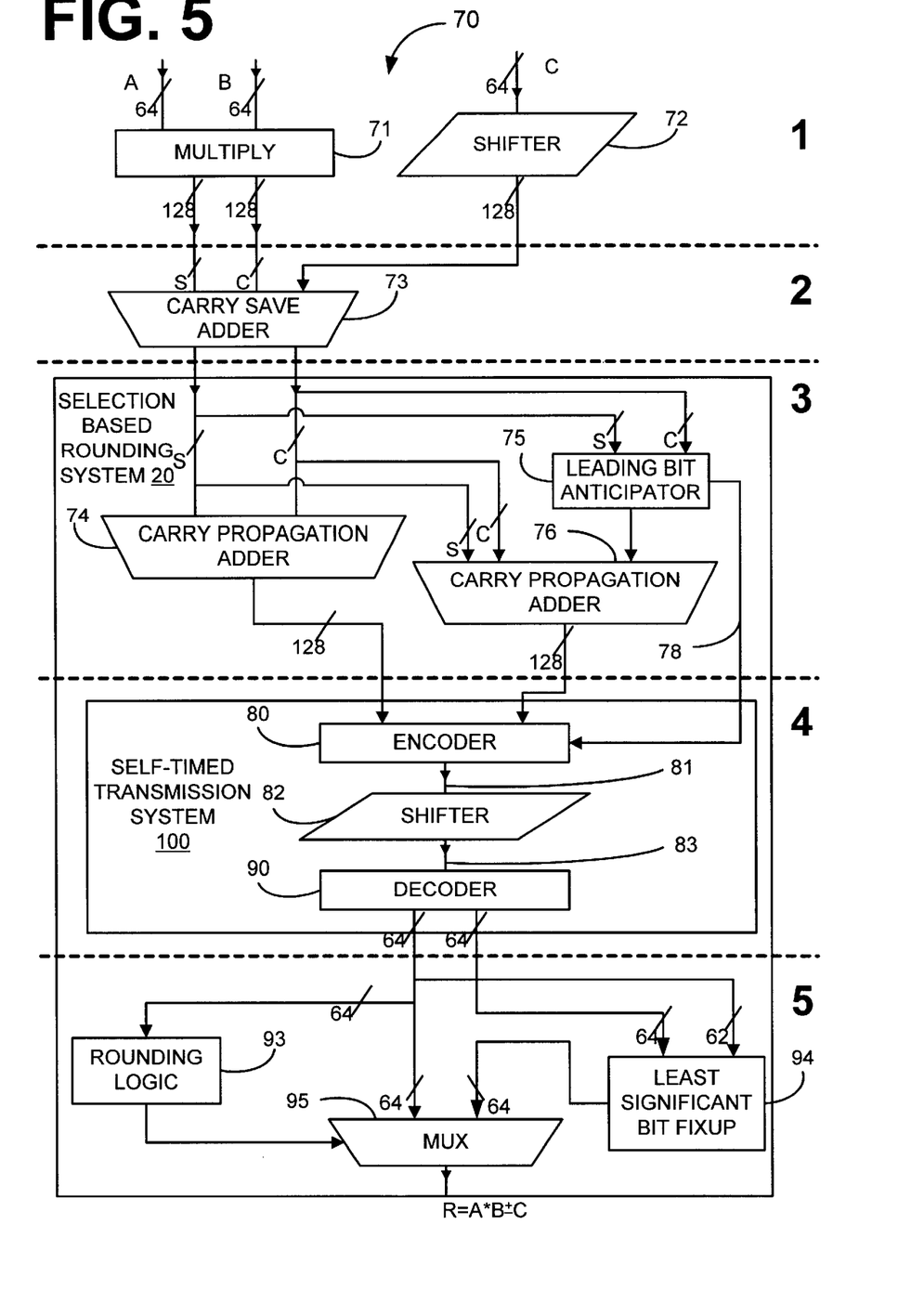
FIG. 5 is a block diagram of a second embodiment of a FP fused multiply adder that employs the selection based rounding system of FIG. 2.

FIG. 5 is a block diagram of a second embodiment of a FP fused multiply adder, generally denoted by reference numeral 70, that employs the selection based rounding system 20 (FIG. 2). The FP fused multiply adder 70 is segregated, or divided, into timing sections, that include logic operations occurring in roughly the same timing period. As can be seen in FIG. 5, the FP fused multiply adder 70 is segregated into five timing periods, which makes the adder 70 faster than the prior art fused multiply adder 5 (FIG. 1) and about the same speed as the first embodiment of the fused multiply adder (FIG. 3). However, the second embodiment has the significant advantage of less hardware than the first embodiment, as will be described hereafter.

The functionality of multiplier 71, shifter 72, carry save adder 73, carry propagation adder 74, leading bit anticipator 75 and carry propagation adder 76 of FIG. 5 are all essentially the same as corresponding elements 51–56 described above relative to the first embodiment of FIG. 3. The principal difference between the first embodiment and the second embodiment is that the second embodiment utilizes a self-timed transmission system 100, which normalizes both the incremented and unincremented FP numbers in a shared communication path having a normalizing shifter 82, and the path is self-timed. Thus, the second embodiment saves the expense of one shifter.

The self-timed transmission system 100 of the fused multiply adder 70 in accordance with the second embodiment generally utilizes the following: an encoder 80, shifter 82, and decoder 90. The encoder 80 essentially interleaves the unincremented FP number SUM and the approximate incremented FP number SUM+Δ along the common path 81. The shared shifter 82 is interconnected with the encoder 80 for receiving successively the unincremented FP number SUM and the approximate incremented FP number SUM+Δ and for normalizing the same successively. The a decoder 90 essentially de-interleaves the normalized incremented and unincremented FP numbers from the common processing path. An example of a possible implementation for the encoder 80, shifter 82, and decoder 90 is described in commonly assigned copending U.S. patent application entitled "SELF-TIMED TRANSMISSION SYSTEM AND METHOD FOR PROCESSING MULTIPLE DATA SETS," having Serial Number 9/583,206 filed on May 30, 2000, and herein incorporated by reference.

The shifter 82 shifts the encoding data the required bits to the left or the required bits to the right. The shifter 82 is directed by input 78 from the leading bit anticipator 75, on the required number of bits to shift the encoded numbers and the direction of the shift. The normalized encoded output of shifter 82 is then input into decoder 90.

The functionality of rounding logic 93, LSB fixup mechanism 94, and MUX 95 are essentially the same as corresponding elements 63–65 described above in regard to the first embodiment of FIG. 3.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. A method for a floating point fused multiply adder in a processor, comprising the steps of:

computing substantially concurrently an unincremented result and an incremented result;

normalizing said unincremented result and said incremented result; and selecting either the normalized unincremented result or the normalized incremented result as a floating point rounded number.

2. The method of claim 1, further comprising the step of:

providing said incremented result prior to normalizing said unincremented result and said incremented result.

3. The method of claim 2, wherein, during said normalizing step, said unincremented result and said incremented result are normalized substantially concurrently within parallel shifters.

4. The method of claim 2, wherein, during said normalizing step, said unincremented result and said incremented result are normalized successively using a single shifter.

5. The method of claim 4, further comprising the step of communicating said unincremented result and said incremented result through said single shifter in a self-timed manner.

6. The method of claim 1, further comprising the steps of:

computing an approximate incremented result;

analyzing said unincremented result and said approximate incremented result to produce an accurate incremented result; and wherein said selecting step involves selecting between said unincremented result and said accurate incremented result.

7. A method for providing a floating point rounded number, the method comprising the steps of:

combining first and second operands to produce a product;

shifting a third operand so that said third operand can be combined with said product;

combining said product and said shifted third operand to produce a first sum and a first carry;

determining, from said first sum and first carry, an approximate leading bit location in said first sum;

producing a leading bit anticipator (LBA) word that, when shifted, defines a one approximately in a least significant bit position of said first sum;

combining said first sum and said first carry to produce an unincremented result;

combining said shifted LBA word with said first sum and said first carry to produce an approximate incremented result;

normalizing said unincremented result;

normalizing said approximate incremented result;

analyzing said unincremented result and said approximate incremented result to produce an accurate incremented result; and selecting either said unincremented result or said accurate incremented result based upon rounding indicia associated with said unincremented result.

8. A floating point fused multiply adder comprising:

logic configured to compute, in parallel, an unincremented result and an incremented result;

logic configured to normalize said unincremented result and said incremented result; and logic configured to select either said normalized unincremented result or said normalized incremented result as a floating point rounded number.

9. A processor employing the floating point fused multiply adder of claim 8.

10. The floating point fused multiply adder of claim 8, wherein said logic configured to normalize comprises a single shifter for receiving said unincremented result and said incremented result and for shifting said results in a self-timed manner.

11. A fused multiply comprising:

(1) a multiplier designed to combine first and second operands to produce a product;

(2) a first shifter designed to shift a third operand so that said third operand can be combined with said product;

(3) a carry save adder designed to combine said product and said shifted third operand to produce a first sum and a first carry;

(4) a leading bit anticipator (LBA) designed to determine an approximate leading bit location in said first sum and for producing an LBA word that, when shifted, defines a one approximately in a least significant bit position of said first sum;

(5) a first carry propagation adder designed to combine said first sum and said first carry to produce an unincremented result;

(6) a second carry propagation adder designed to combine said shifted LBA word with said first sum and said first carry to produce an approximate incremented result;

(7) a second shifter designed to normalize said unincremented result;

(8) a third shifter designed to normalize said approximate incremented result;

(9) a least significant bit fixup mechanism designed to convert said approximate incremented result into an accurate incremented result; and (10) a multiplexer designed to receive said unincremented result and said accurate incremented result; and (11) rounding logic designed to select said unincremented result and to select said accurate incremented result, only either one at a time, by controlling said multiplexer, based upon rounding indicia associated with said unincremented result.

12. A processor, comprising:

a fused multiply adding means for producing a floating point rounded number, comprising:

first means for computing in parallel an unincremented result and an incremented result;

second means for normalizing said unincremented result and said incremented result; and third means for selecting said normalized unincremented result and for selecting said normalized incremented result as said floating point rounded number, only either one at a time.

13. The processor of claim 12, further comprising:

fourth means for producing said incremented result prior to normalizing said unincremented result and said incremented result.

14. The processor of claim 12, wherein said second means normalizes said unincremented result and said incremented result substantially concurrently within parallel shifters.

15. The processor of claim 12, wherein said second means normalizes said unincremented result and said incremented result in succession using a single shifter.

16. The processor of claim 15, further comprising means for communicating said unincremented result and said incremented result through said single shifter in a self-timed manner.

17. The processor of claim 15, further comprising:

means for computing an approximate incremented result;

means for analyzing said unincremented result and said approximate incremented result to produce an accurate incremented result; and wherein said third means performs the function of selecting between said unincremented result and said accurate incremented result.

18. The processor of claim 12:
(a) wherein said first means comprises:
  (1) a multiplier means for combining first and second operands to produce a product;
  (2) a first shifter means for shifting a third operand so that said third operand can be combined with said product;
  (3) a carry save adder means for combining said product and said shifted third operand to produce a first sum and a first carry;
  (4) a leading bit anticipator (LBA) means for determining an approximate leading bit location in said first sum and for producing a shifted LBA word that defines a one approximately in a least significant bit position of said first sum;
  (5) a first carry propagation adder means for combining said first sum and said first carry to produce said unincremented result;
  (6) a second carry propagation adder means for combining said shifted LBA word with said first sum and said first carry to produce an approximate incremented result;
  (7) a second shifter means for normalizing said unincremented result;
  (8) a third shifter means for normalizing said approximate incremented result; and
  (9) a least significant bit fixup means for converting said approximate incremented result into an accurate incremented result; and (b) wherein said third means comprises:
  (1) a multiplexer means for receiving said unincremented result and said accurate incremented result; and
  (2) rounding logic means for selecting said unincremented result and for selecting said accurate incremented result, only either one at a time, by controlling said multiplexer means, based upon rounding indicia associated with said unincremented result.

19. The processor of claim 12:
(a) wherein said first means comprises:
  means for combining first and second operands to produce a product;
  means for shifting a third operand so that said third operand can be combined with said product;
  means for combining said product and said shifted third operand to produce a first sum and a first carry;
  means for determining an approximate leading bit location in said first sum and for producing an LBA word that, when shifted, defines a one approximately in a least significant bit position of said first sum;
  means for combining said first sum and said first carry to produce said unincremented result;
  means for combining said shifted LBA word with said first sum and said first carry to produce an approximate incremented result;
  means for normalizing said unincremented result; and
  means for normalizing said approximate incremented result; and
(b) wherein said third means comprises:
  means for producing an accurate incremented result based upon said unincremented result and said approximate incremented result; and
  means for selecting either said unincremented result or said accurate incremented result based upon rounding indicia associated with said unincremented result.

* * * * *